United States Patent
Shows (10) Patent No.: US 7,772,987 B2
(45) Date of Patent: Aug. 10, 2010

(54) LIGHTING CONTROL FRAMEWORK

(75) Inventor: Thomas Alexander Shows, Leander, TX (US)

(73) Assignee: Dell Products L.P., Round Rock, TX (US)

( * ) Notice: Subject to any disclaimer, the term of this patent is extended or adjusted under 35 U.S.C. 154(b) by 237 days.

(21) Appl. No.: 11/936,895

(22) Filed: Nov. 8, 2007

(65) Prior Publication Data
US 2009/0121893 A1 May 14, 2009

(51) Int. Cl.
*G08B 5/00* (2006.01)
(52) U.S. Cl. ............... 340/815.4; 340/815.52; 340/815.75; 719/328
(58) Field of Classification Search .......... 340/815, 340/815.4, 815.52, 815.75; 719/328
See application file for complete search history.

(56) References Cited

U.S. PATENT DOCUMENTS

2001/0018717 A1* 8/2001 Shimotono ........... 709/319
2005/0034136 A1* 2/2005 Engstrom et al. ......... 719/328
2005/0280550 A1* 12/2005 Kurian et al. .......... 340/815.45
2006/0090031 A1* 4/2006 Kirshenbaum et al. ...... 711/113
2007/0282994 A1* 12/2007 Beers et al. ............. 709/223

OTHER PUBLICATIONS

[Hardware, Info]—Revoltec Light FX; Revoltec Light FX; 1998-2007; p.1-p. 3; HWI Group; http://www. hardware.info/en-US/productdb/bGNkbJiTmJfK/viewproduct/Revoltec_Light_FX/.
Dell XPS M1710 Computer—Notebook PC; 1999-2007; p. 1-p.7; Dell Inc.; http://www1.euro.dell.com/content/ products/productdetails.aspx/xpsnb_m1710?c=ed&l=en&s=bsd.
Notebook and Laptop Reviews; 1999-2007; p. 1-p. 11; Tech Target; http://www.notebookreview.com/default. asp?newsID=3267.
Richard Tonry, et al; "User Programmable Architecture For Control Of A Light Device Used With An Information Handling System Chassis"; Filing Date Jul. 31, 2007; U.S. Appl. No. 11/830,880.

* cited by examiner

*Primary Examiner*—Davetta W Goins
*Assistant Examiner*—Ojiako Nwugo
(74) *Attorney, Agent, or Firm*—Haynes and Boone, LLP (57) ABSTRACT

A lighting control framework is provided. The lighting control framework receives an implicit request from an application. The implicit request is converted into a converted explicit request which is processed to utilize a light of a lighting device.

16 Claims, 6 Drawing Sheets

LIGHTING CONTROL FRAMEWORK

BACKGROUND

The present disclosure relates generally to information handling systems, and more particularly to lighting devices and lights coupled to information handling systems.

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, networking systems.

Some IHSs include exterior lights which may be used by software applications on the IHSs for entertainment purposes. Conventionally, software applications must have knowledge of the number, type, size, location, and capabilities of each light. This poses a significant problem to application developers, as they must have intimate knowledge of the underlying hardware of the IHS in order to manipulate the available lights.

Furthermore, software applications are not equipped to allow for the arbitrary addition, removal, or other reconfiguration of the lights.

Accordingly, it would be desirable to provide an improved lighting control framework absent the disadvantages described above.

SUMMARY

According to one embodiment, a lighting control framework is provided. The lighting control framework receives an implicit request from an application. The implicit request is converted into a converted explicit request which is processed to utilize a light of a lighting device.

DETAILED DESCRIPTION

For purposes of this disclosure, an IHS may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a notebook computer, a desktop computer, a personal computer, a PDA, a consumer electronic device, a network server or storage device, a switch router or other network communication device, or any other suitable device and may vary in size, shape, performance, functionality, and price. The IHS may include memory, at least one processing resources such as a central processing unit (CPU) or hardware or software control logic. Additional components of the IHS may include at least one storage devices, at least one communications ports for communicating with external devices as well as various input and output (I/O) devices, such as a keyboard, a mouse, and a video display. The IHS may also include at least one bus operable to transmit communications between the various hardware components.

Figure 1:
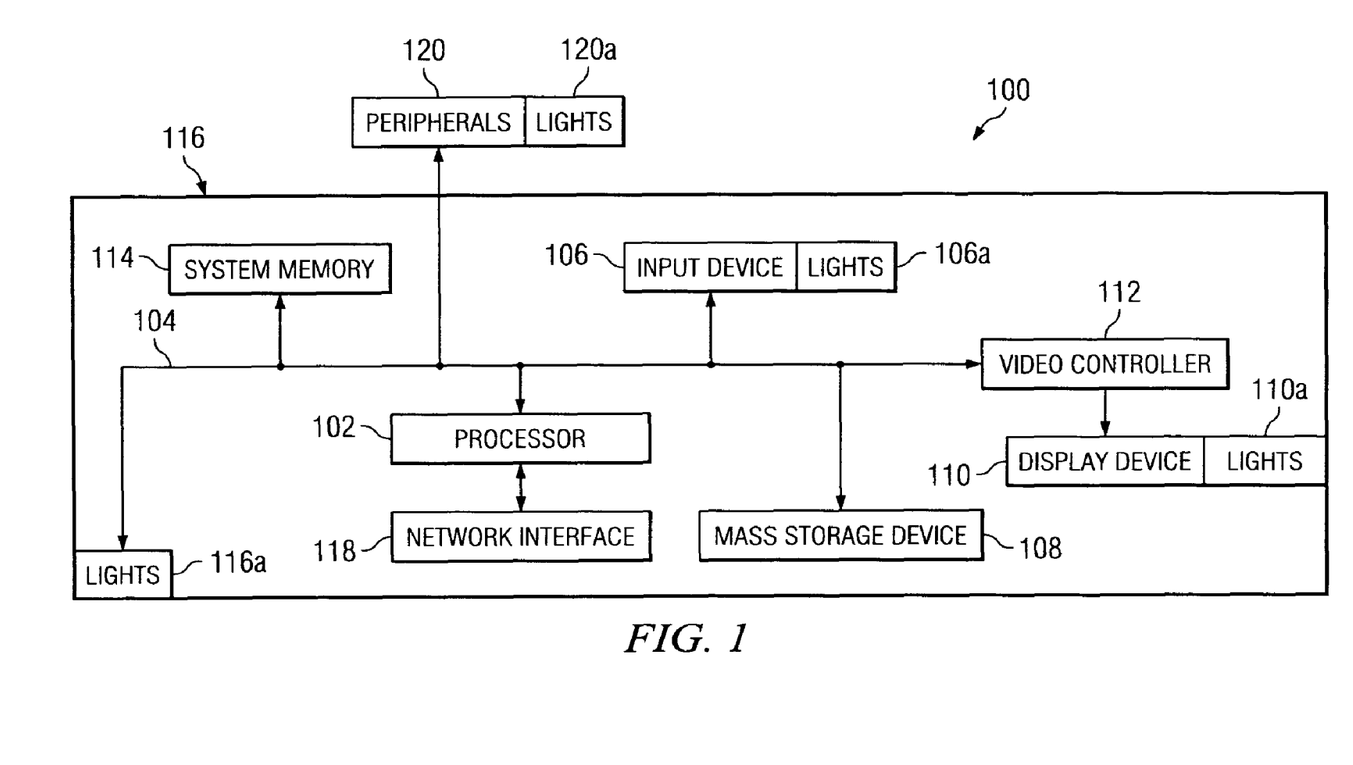
FIG. 1 illustrates an embodiment of an information handling system (IHS).

Referring now to FIG. 1, in one embodiment, an IHS 100 includes a processor 102, which is connected to a bus 104. Bus 104 serves as a connection between processor 102 and other components of IHS 100. An input device 106 is coupled to processor 102 to provide input to processor 102. Examples of input devices include keyboards, touchscreens, and pointing devices such as mouses, trackballs and trackpads. The input device 106 includes at least one input device light such as light 106*a*. Programs and data are stored on a mass storage device 108, which is coupled to processor 102. Mass storage devices include such devices as hard disks, optical disks, magneto-optical drives, floppy drives and the like. IHS 100 further includes a display 110, which is coupled to processor 102 by a video controller 112. The display 110 includes at least one display light such as light 110*a*. A system memory 114 is coupled to processor 102 to provide the processor 102 with fast storage to facilitate execution of computer programs by processor 102. In an embodiment, a chassis 116 houses some or all of the components of IHS 100. In an embodiment, the chassis 116 includes at least one chassis light such as light 116*a*. A network interface 118 is coupled to the processor 102 to provide the processor 102 access to a network. Peripherals 120 are coupled to the processor 102. The peripherals 120 may include additional input devices. The peripherals 120 include at least one peripheral light such as light 120*a*. It should be understood that other buses and intermediate circuits can be deployed between the components described above and processor 102 to facilitate interconnection between the components and the processor 102. It should also be understood that the IHS 100 may not include lights 106*a*, 110*a*, 116*a*, or 118*a*. It should also be understood that the IHS 100 may include additional lights that are not depicted in FIG. 1.

Components that include lights may be referred to as lighting devices. For example, in FIG. 1, the input device 106, the display 110, the chassis 116, and the peripherals 120 may be referred to as lighting devices. The lights may be used by a variety of applications for a variety of purposes such as, for example, gaming environments, ambience, video accompaniment, audio accompaniment, and/or a variety of other purposes known in the art. The lights may be utilized by software to change states of the lights. The changing of states may include, for example, turning on, turning off, changing color, changing brightness, and/or a variety of other state changes known in the art.

Figure 2:
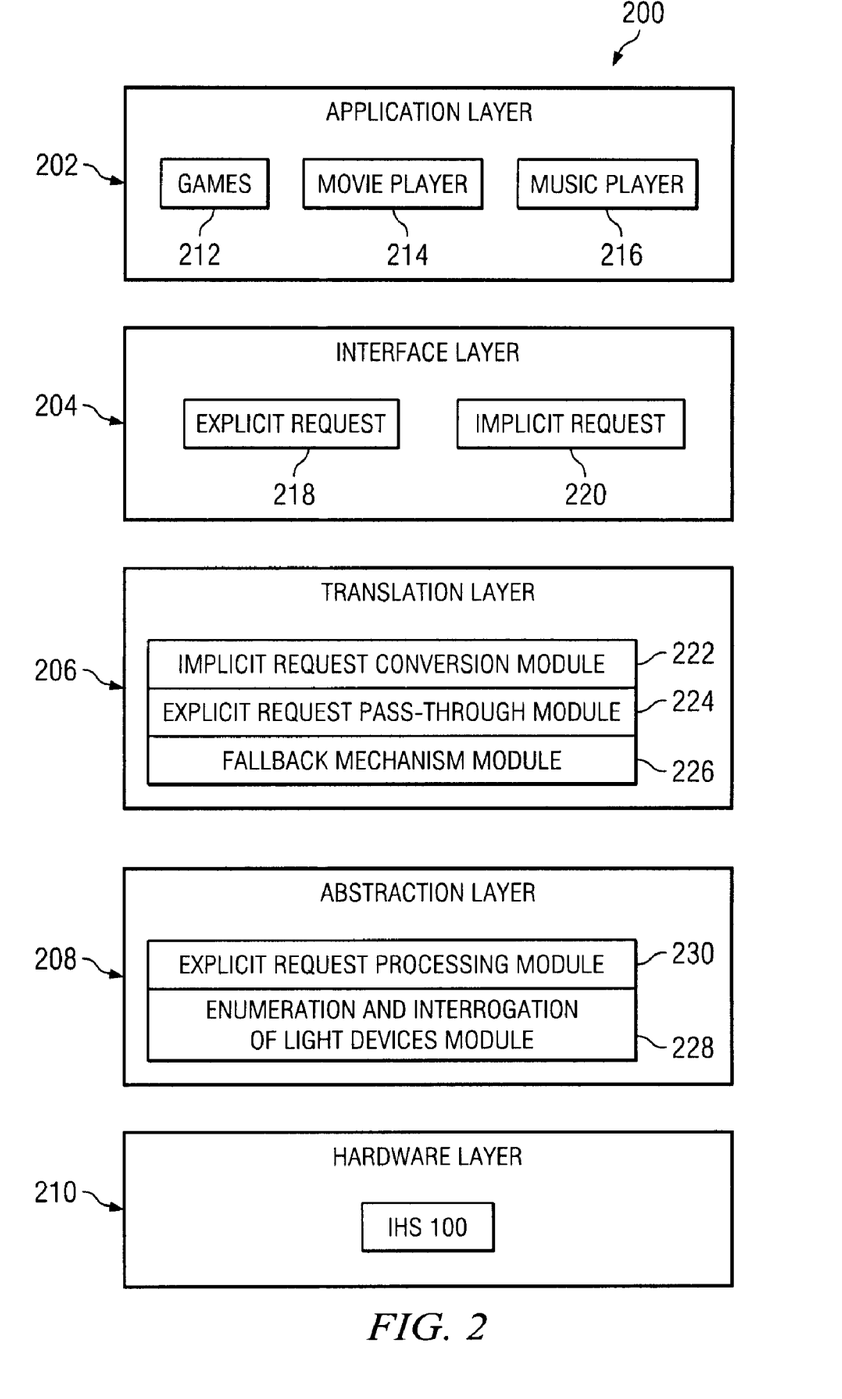
FIG. 2 illustrates an embodiment of a system including software layers and a hardware layer for utilizing lights of the IHS of FIG. 1.

Referring now to FIG. 2, an embodiment of a system 200 including software layers and a hardware layer for utilizing lights of the IHS 100 is depicted. The lights may include, for example, one or all of the input device light 106*a*, the display light 110a, the chassis light 116a, the peripheral light 118a, and/or any other lights of the IHS 100. The system 200 includes four software layers (an Application Layer 202, an Interface Layer 204, a Translation Layer 206, an Abstraction Layer 208) and a hardware layer (Hardware Layer 210). The software layers 202, 204, 206, and 208 may be stored in the mass storage device 108, and may be loaded into the system memory 114 in order to be executed by the processor 102. The software layers 204, 206, and 208 are an embodiment of a lighting control framework.

The Application Layer 202 includes applications such as, for example, a game 212, a movie player 214, a music player 216, and/or a variety of other applications known in the art. The applications 212, 214, and 216 are user-mode executables that link to the Interface Layer 204. The linking may occur, for example, dynamically or statically.

The Interface Layer 204 includes an application programming interface (API), which enables the applications 212, 214, and 216 of the Application Layer 102 to send requests to the Interface Layer 204. The Interface Layer 204 then sends the requests to the Translation Layer 206. The requests may include light change requests, which may be requests to utilize at least one of the lights of the IHS 100. A light change request may include an explicit request such as the Explicit Request 218 and/or an implicit request such as the Implicit Request 220.

An implicit request is a request wherein the applications 212, 214, and 216 need no information about the hardware of the IHS 100, such as for example, the number of lights, locations of the lights, types of the lights, capabilities of the lights, and/or sizes of the lights. In the implicit request 220, an application may, for example, specify general regions and colors of lights which should be employed, without the application having any knowledge of the specific lights being employed. In one embodiment, the Implicit Request 220 may include a location bitmask and/or a color value. Each bit of the location bitmask may correspond to a desired region of the IHS 100 in which to utilize lights, and the color value may indicate a desired color with which to configure the lights. In one embodiment, the location bitmask may include 27 bits, with each bit corresponding to a region of a 3×3 cube, wherein the cube represents the various regions of the IHS 100 as viewed by a user of the IHS 100.

Conversely, an explicit request is a request wherein specific information about the hardware of the IHS 100 is used to specify which of the lights of the IHS 100 should be employed, and/or how they should be employed. Prior to an explicit request, the Interface Layer may provide, for example, the locations, types, capabilities, and sizes of all the lights of the IHS 100 to the applications 212, 214, and 216 of the Application Layer 102. The applications 212, 214, and 216 may then issue an explicit request specifying the specific lights to be utilized, and/or specific features of the specific lights to utilize.

The Translation Layer 206 includes platform-specific knowledge about the IHS 100, which it receives from the Abstraction Layer 208. The platform-specific knowledge may include knowledge about the lights of the IHS 100 such as, for example, their locations, types, capabilities, and sizes. The capabilities of the lights may include a variety of light capabilities known in the art, such as colors that the lights can display. The Translation Layer 206 further includes an Implicit Request Conversion Module 222, an Explicit Request Pass-Through Module 224, and a Fallback Mechanism Module 226. In one embodiment, the Translation Layer 206 may receive an explicit light change request from the Interface Layer 204, and the Explicit Request Pass-Through Module 224 may then pass the explicit request directly to the Abstraction Layer 208. In another embodiment, the Translation Layer 206 may receive an implicit light change request from the Interface Layer 204, and the Implicit Request Conversion Module 222 may then use the platform-specific knowledge to attempt to convert the implicit request to an explicit request. For example, if the implicit request specifies to turn on all lights in a region A, the Implicit Request Conversion Module 222 may use knowledge that the light 110a is in the region A, and may create a corresponding explicit request to turn on the light 110a. If the Implicit Request Conversion Module 222 successfully converts the implicit request to an explicit request, the converted explicit request is then passed to the Abstraction Layer 208. If the implicit request cannot be converted to an explicit request, the Fallback Mechanism Module 226 is used to determine whether the hardware of the IHS 100 is able to substitute a light change close enough to the implicit request. For example, if the implicit request specifies to change lights in a region B to a turquoise color, but the lights in region B of the IHS 100 do not have the capability to produce the turquoise color, the Fallback Mechanism Module 226 may determine that aqua blue is close enough to turquoise, and is therefore a reasonable substitution. As an additional example, if the implicit request specifies to turn on all lights in a region C to a high brightness, but the IHS 100 has no lights corresponding to the region C, the Fallback Mechanism Module 226 might determine that a reasonable substitution includes turning on lights in two regions adjacent to region C at a medium brightness. If the Fallback Mechanism Module 226 is able to determine a reasonable substitution, the implicit request is converted to an explicit request associated with the substitution, and the converted explicit request is then passed to the Abstraction Layer 208. If a reasonable substitution cannot be determined, the Fallback Mechanism Module 226 determines that a light change will not be made.

The Abstraction Layer 208 includes an Enumeration and Interrogation of Light Devices Module 228 and an Explicit Request Processing Module 230. The Enumeration and Interrogation of Light Devices Module 228, when first loaded, discovers all the lighting devices and lights in the system by interrogating different subsystems of the IHS 100 such as, for example, BIOS, USB, PCI, Bluetooth, Wireless USB, and a variety of other IHS subsystems and buses known in the art. It then creates and provides a data structure that describes the locations, sizes, capabilities, and states of the lighting devices and lights of the IHS 100. The data structure may be in a standardized format usable by the various layers 202, 204, 206, 208 of this embodiment. In an embodiment, the Enumeration and Interrogation of Light Devices Module 228 may automatically detect the addition or removal of a lighting device, and then may update the data structure accordingly. The Explicit Request Processing Module 230 receives explicit requests from the Translation Layer 206 and then communicates directly with the Hardware Layer 210 to utilize the lights 106a, 110a, 116a, and 120a as specified by the explicit request.

The Hardware Layer 210 may include, for example, a notebook computer, a desktop computer, and/or a peripheral. In the illustrated embodiment, the Hardware Layer 210 includes the IHS 100, described above with reference to FIG. 1. The Hardware Layer 210 receives communications from the Abstraction Layer 208, and performs light changes as requested.

Figure 3A:
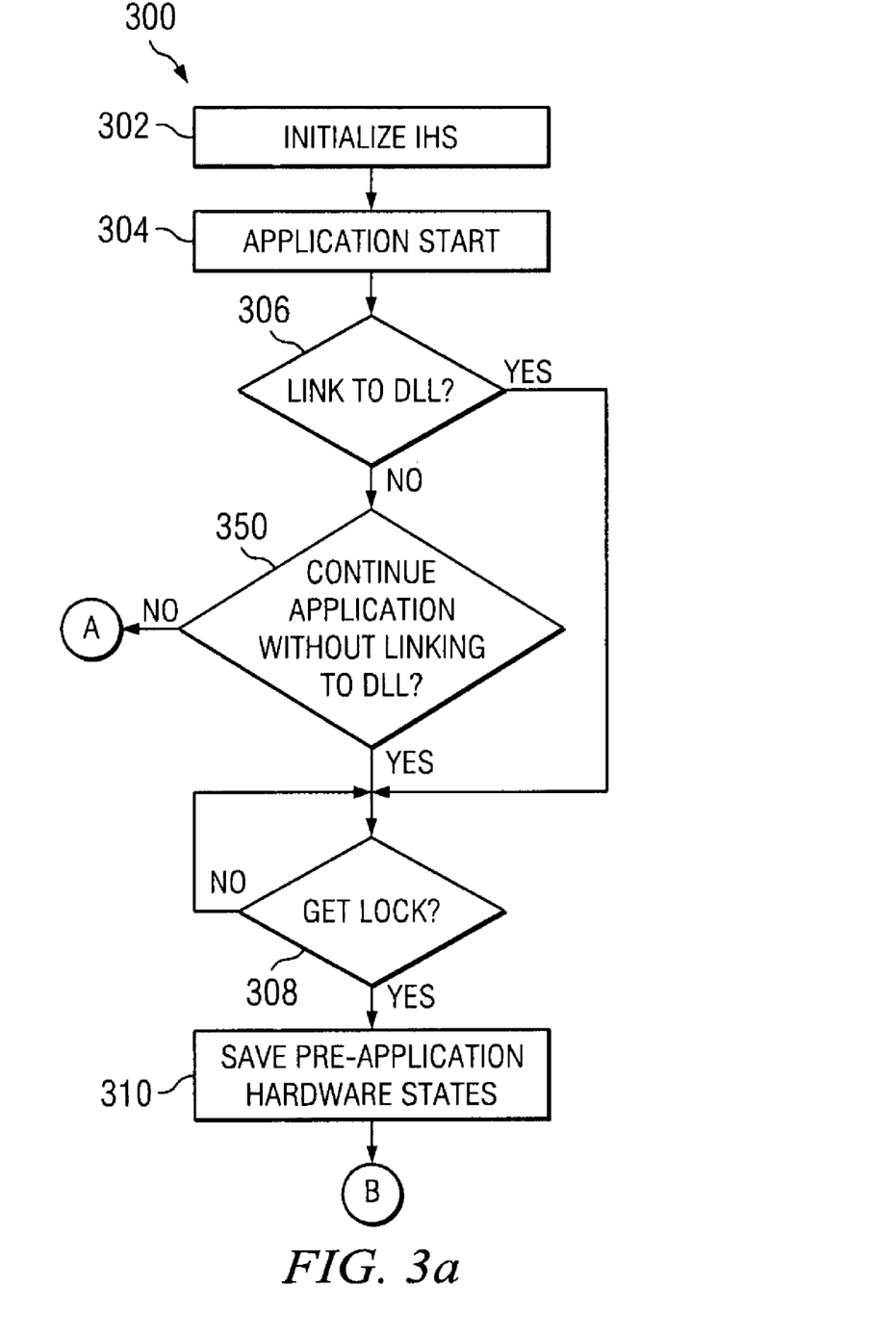
FIGS. 3*a*, 3*c*, and 3*d* illustrate an embodiment of a method to utilize lights of the IHS of FIG. 1.

Referring now to FIG. 3a, an embodiment of a method 300 is illustrated. The method 300 begins at block 302 where an IHS is initialized. In an embodiment, the IHS is the IHS 100, described above with reference to FIG. 1. The initialization may be performed by software and/or hardware, and may include hardware initialization and/or software initialization. The hardware initialization may include, for example, configuring various components of the IHS 100, including the lights 106a, 110a, 116a, and 120a, to an initial state such that they may be utilized by software. The software initialization may include, for example, loading of software, execution of software, discovering the hardware configuration, and storing the hardware configuration. In an embodiment, part or all of the initialization may be performed by the Enumeration and Interrogation of Light Devices Module 228, described above with reference to FIG. 2.

The method 300 then continues to block 304 where an application starts execution. In an embodiment, the application is one of the applications 212, 214, and 216, described above with reference to FIG. 2. The method 300 then continues to decision block 306 where the application attempts to link to a dynamically linked library (DLL). In an embodiment, the DLL library may include part or all of the Interface Layer 204, the Translation Layer 206, and/or the Abstraction Layer 208, described above with reference to FIG. 2. In an embodiment, the DLL is a Light FX (LFX) DLL. The DLL loads subroutines of a library into the application when the application is loaded or when the application is executed. In an embodiment, the application may include a static library instead of, or in addition to, the DLL. The static library may be, for example, compiled into the executable of the application during compilation.

If it is determined at decision block 306 that the application is able to link to a DLL, the method 300 then continues to decision block 308 where the application attempts to obtain an exclusive lock for accessing one or more of the lights of the IHS. The exclusive lock may be used to prevent other applications from utilizing the lights. If it as determined at decision block 308 that the application is unable to obtain the exclusive lock, the method 300 then returns to block 308 where it proceeds to attempt to obtain the exclusive lock.

If it is determined at decision block 308 that the application is able to obtain the exclusive lock, the method 300 then continues to block 310 where pre-application hardware states of the IHS 100 are saved. The pre-application hardware states include hardware states of the lighting hardware (e.g., the lighting devices and the lights of the lighting devices) of the IHS 100 prior to the application requesting any light change requests. The hardware states may include, for example, colors, brightnesses, tints, blinking configurations, and/or a variety of other lighting hardware states known in the art.

Figure 3B:
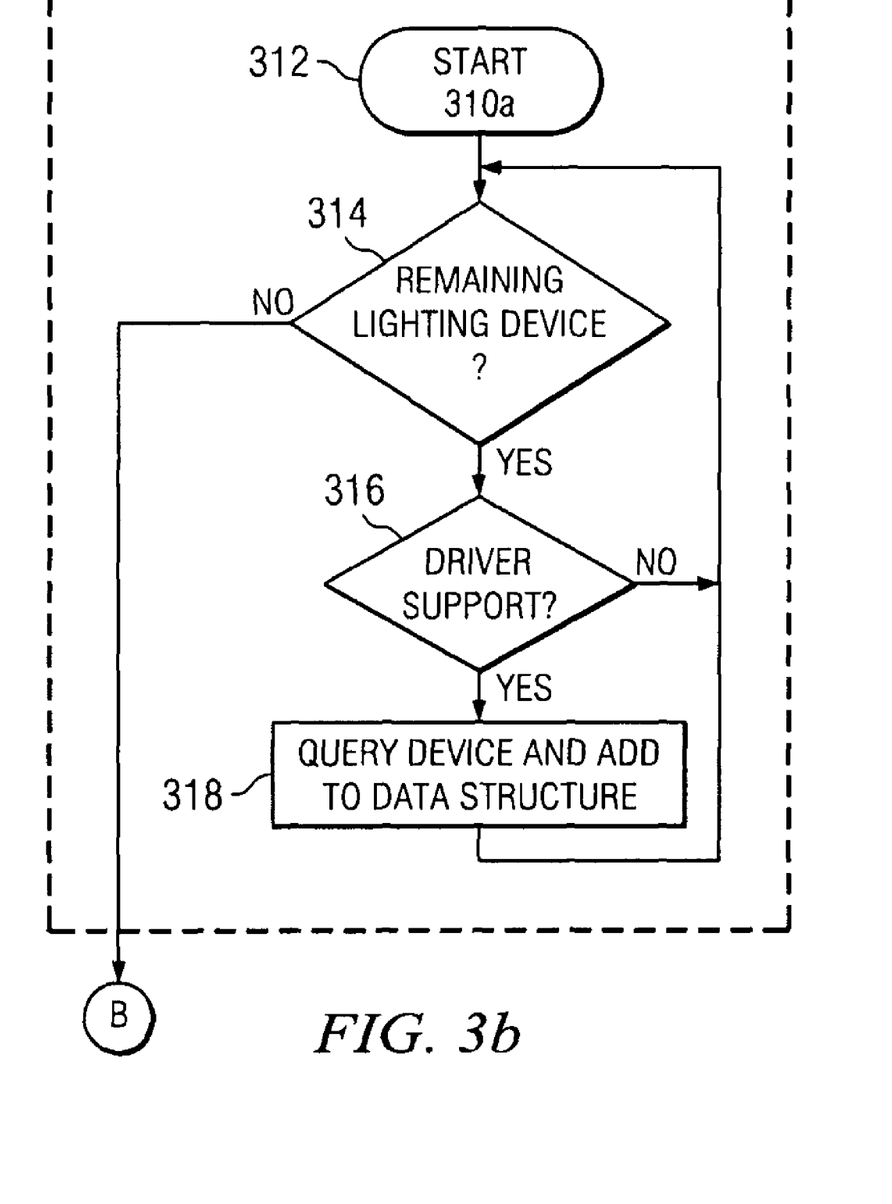
FIG. 3*b* illustrates an embodiment of a method to save pre-application hardware states of lights of the IHS of FIG. 1.

Referring now to FIGS. 3a and 3b, in an embodiment, the block 310 includes method 310a. The method 310a begins at block 312 after the exclusive lock is obtained at decision block 308. The method 310a then proceeds to decision block 314 where it is determined whether there is a remaining lighting device to query.

If it is determined at decision block 314 that there is a remaining lighting device to query, the method 310a continues to decision block 316 where it is determined whether there is driver support for the remaining lighting device. If it is determined at decision block 316 that there is driver support for the remaining lighting device, the method 310a continues to decision block 318 where the configuration of the lighting hardware associated with the lighting device is queried and added to a pre-application hardware states data structure. The method 310a then returns to decision block 314 where it is determined whether there is another remaining lighting device.

If it is determined at decision block 316 that there is no driver support for the remaining lighting device, the method 310a returns to decision block 314 where it is determined whether there is another remaining lighting device.

Figure 3C:
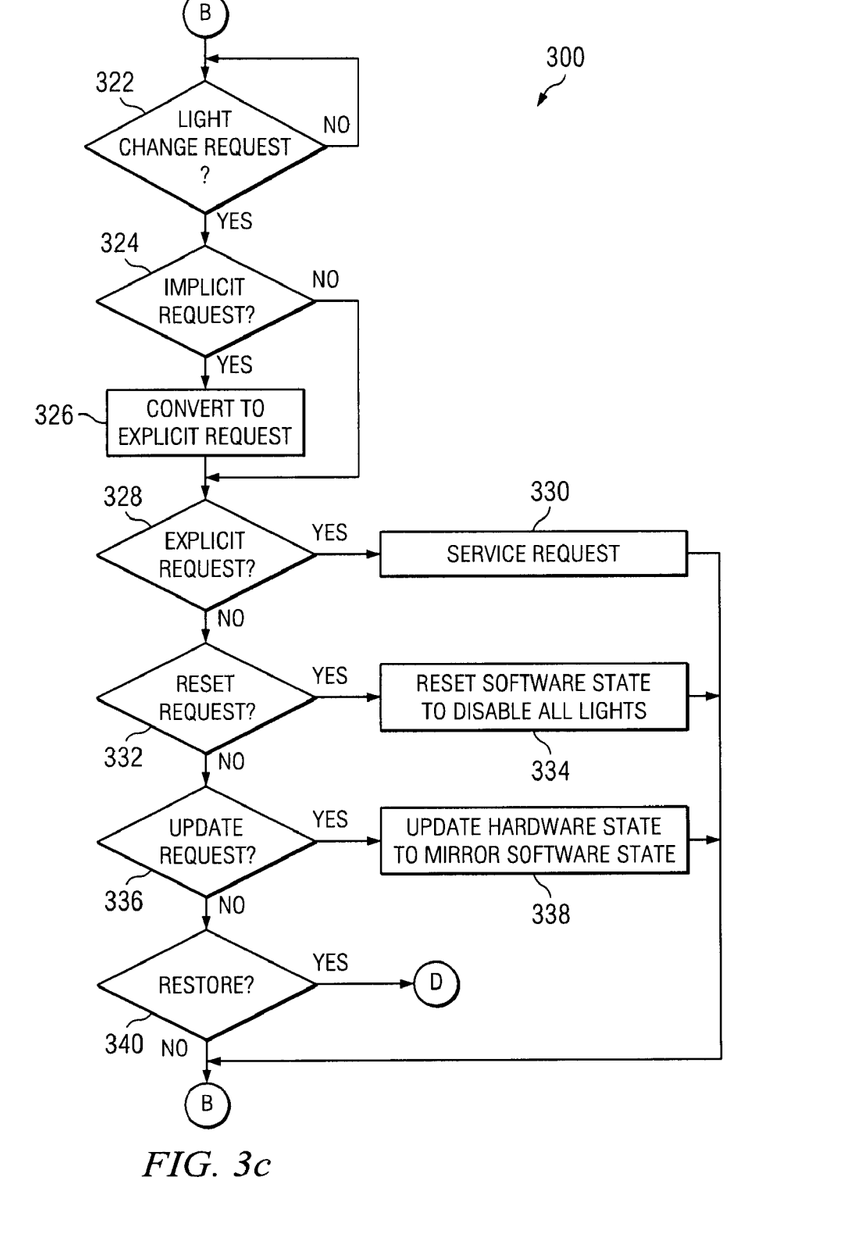

Referring now to FIGS. 3a-3c, if it is determined at decision block 314 that there is not another remaining lighting device, the pre-application hardware states data structure is saved, and the method 310 ends. The method 300 then continues to decision block 322 where it is determined whether there is a light change request. In an embodiment, the determining whether there is a light change request may be performed by the Interface Layer 204 and/or the Translation Layer 206, described above with reference to FIG. 2. In an embodiment, the light change request may originate from the Application Layer 202. If it is determined at decision block 322 that there is not a light change request, the method 300 then returns to decision block 322 where it proceeds to determine if there is a light change request.

If it is determined at decision block 322 that there is a light change request, the method 300 continues to decision block 324 where it is determined whether the light change request is an implicit request, similar to as described above. In an embodiment, the determining whether the light change request is an implicit request may be performed by the Translation Layer 206. If it is determined at decision block 324 that the light change request is an implicit request, then the method 300 continues to block 326 where the implicit request is converted to an explicit request. In an embodiment, the conversion may be performed by the Implicit Request Conversion Module 222, described above with reference to FIG. 2. In an embodiment, the conversion to an explicit request may include recomputation of colors and brightnesses for all lights of the IHS 100. The method then proceeds to decision block 328, described below, wherein the converted explicit request is substituted for the light change request of decision block 328.

If it is determined at decision block 324 that the light change request is not an implicit request, then the method 300 continues to decision block 328 where it is determined whether the light change request is an explicit request, similar to as described above. In an embodiment, the determining whether the light change request is an implicit request may be performed by the Translation Layer 206. If it is determined at decision block 328 that the request to change the light is an explicit request, the method 300 continues to block 330 where the explicit request is serviced. The servicing of the explicit request includes using the explicit request to update a software state and/or a hardware state. The software state may include a cached representation of a hardware state of the lighting hardware of the IHS 100. In an embodiment, the hardware state may not be updated to match the software state unless explicitly specified by the application, or may be only updated to match the software state after a certain time interval. The updating of the hardware state includes utilizing the lights of the IHS 100 as specified by the software state and/or the explicit request. In an embodiment, the servicing of the explicit request may be performed by the Explicit Request Processing Module 230, described above with reference to FIG. 2. The method 300 then returns to block 322 where it is determined whether there is another light change request.

If it is determined at decision block 328 that the light change request is not an explicit request, then the method 300 continues to decision block 332 where it is determined whether the light change request is a reset request. A reset request is a request to update the software state and/or the hardware state such that all of the lights are disabled. If it is determined at decision block 332 that the light change request is a reset request, then the method 300 continues to block 334 where the reset request is performed. The method 300 then returns to block 322 where it is determined whether there is another light change request.

If it is determined at decision block 332 that the request to change the light is not a reset request, then the method 300 continues to block 336 where it is determined whether the light change request is an update request. An update request is a request to update the hardware state such that it matches the software state. If it is determined at decision block 336 that the light change request is an update request, the method 300 then continues to block 338 where the hardware state is updated to mirror the software state. In an embodiment, the hardware state may be updated by the Explicit Request Processing Module 230, described above with reference to FIG. 2. The method 300 then returns to block 322 where it is determined whether there is another request to change a light.

If it is determined at decision block 336 that the light change request is not an update request, the method 300 then continues to decision block 340 where it is determined whether the pre-application hardware states of the IHS 100 should be restored. The restoring includes updating the lighting hardware to the hardware state before the application issued any lighting request. It If it is determined at decision block 340 that the light pre-application hardware states of the IHS 100 should not be restored, the method 300 then returns to decision block 322 where it is determined whether there is another light change request.

Figure 3D:
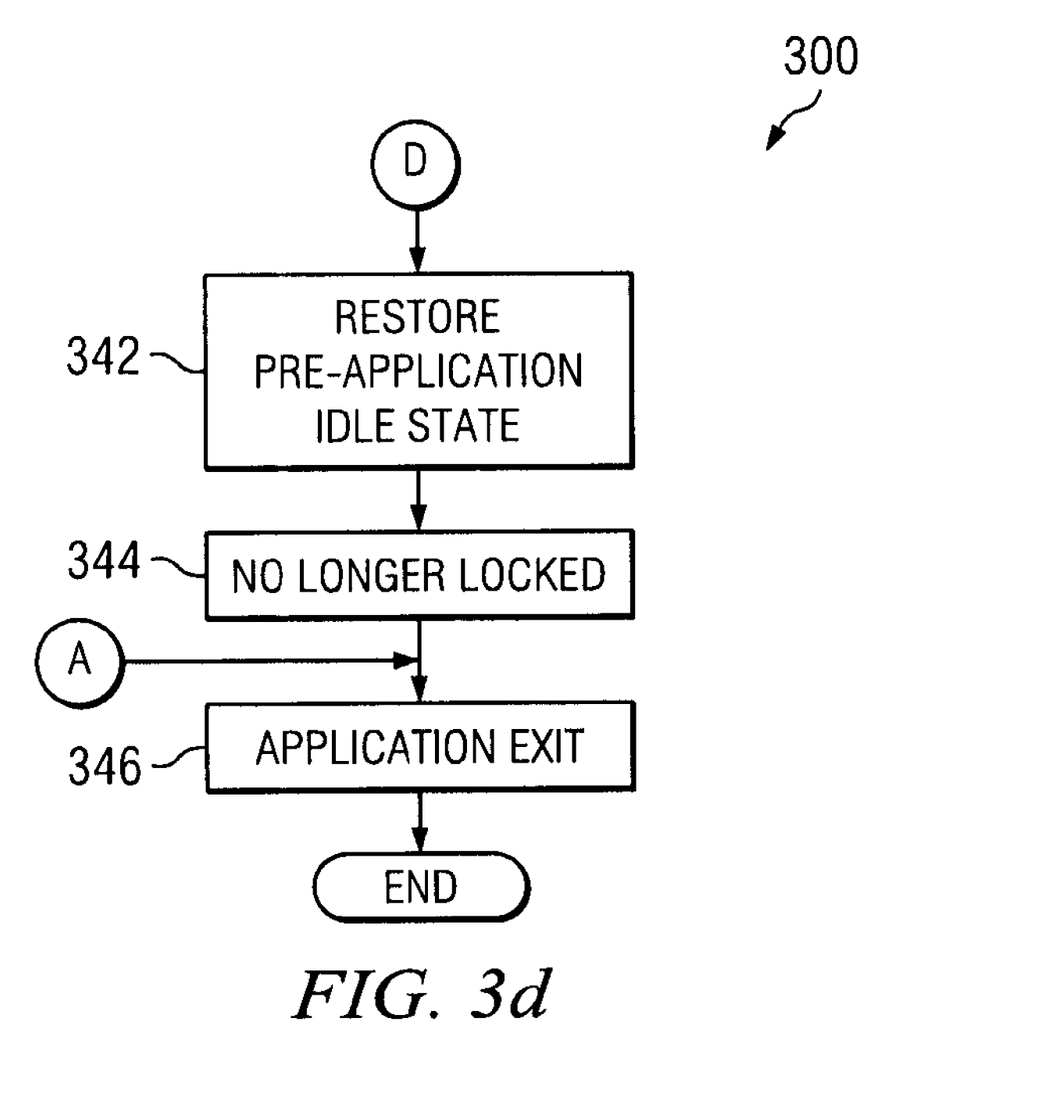

Referring now to FIGS. 3c and 3d, if it is determined at decision block 340 that the pre-application hardware states of the IHS 100 should be restored, the method 300 then proceeds to block 342 where the pre-application hardware states of the IHS 100 are restored using the pre-application hardware states that were saved in block 310. The method 300 then continues to block 344 where the exclusive lock is released so that other applications may utilize the lights. The method 300 then continues to block 346 where the application exits. The method 300 then ends at block 348.

Referring now to FIGS. 3a and 3d, if at decision block 304 it is determined that the application is unable to link to the DLL, the method 300 continues to block 350 where it is determined whether the application should continue without linking to the DLL. If it is determined that the application should not continue without linking to the DLL, the method 300 then continues to block 346 and continues in a substantially similar manner from block 346 as described above until the method 300 ends at block 348.

Referring now to FIG. 3a, if at decision block 350 it is determined that the application should continue without linking to the DLL, the method 300 continues to block 306 and continues in a substantially similar manner from block 306 as described above until the method 300 ends at block 348.

Thus, embodiments are disclosed that provide a lighting control framework, including an application programming interface (API), that enables applications to utilize lights of an IHS without requiring the applications to have knowledge of the number, type, size, location, and capabilities of the lights in the IHS.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A method for an information handling system (IHS) comprising:
   providing lighting control framework, wherein the lighting control framework:
      receives an implicit request from an application;
      converts the implicit request to a converted explicit request; and
      processes the converted explicit request to utilize a light of a lighting device; and
   providing multiple layers including an interface layer, a translation layer and an abstraction layer, and wherein the layers comprise:
      the interface layer including an application programming interface (API) enabling applications to send requests to the interface layer;
      the translation layer for receiving either of the implicit or explicit requests from the interface layer and if an implicit request, attempting to convert the implicit request to an explicit request, whereupon the converted or received explicit request is passed on to the abstraction layer; and
      the abstraction layer receiving the explicit request and communicating the request directly to the IHS.

2. The method of claim 1, wherein represented hardware information about the lighting device is used to convert the implicit request to the converted explicit request.

3. The method of claim 2, further comprising:
   detecting the lighting device; and
   creating the represented hardware information about the lighting device.

4. The method of claim 1, wherein the lighting device includes one of a keyboard, a mouse, a computer chassis, a notebook computer, a desktop computer, and a peripheral.

5. The method of claim 2, wherein the represented hardware information includes a number of lights on the lighting device.

6. The method of claim 2, wherein the represented hardware information includes a size of the light of the lighting device.

7. The method of claim 2, wherein the represented hardware information includes a location of the light of the lighting device.

8. The method of claim 2, wherein the represented hardware information includes a capability of the light of the lighting device.

9. The method of claim 8, wherein the capability of the light of the lighting device includes a color capability of the light.

10. The method of claim 2, wherein the lighting control framework automatically detects an addition of an additional lighting device, and wherein the lighting control framework automatically represents additional hardware information about the additional lighting device, resulting in additional represented hardware information.

11. The method of claim 2, wherein the lighting control framework:
   receives an explicit request from the application; and
   processes the explicit request to utilize the light of the lighting device.

12. The method of claim 1, wherein the application includes one of a game, a video player, and a music player.

13. An information handling system (IHS) comprising:
   a lighting device;
   a processor coupled to the lighting device;
   a memory coupled to the processor, wherein the memory includes computer-readable instructions to:

receive an implicit request from an application;

convert the implicit request to a converted explicit request; and process the converted explicit request to utilize a light of the lighting device; and multiple layers including an interface layer, a translation layer and an abstraction layer, and wherein the layers comprise:

the interface layer including an application programming interface (API) enabling applications to send requests to the interface layer;

the translation layer for receiving either of the implicit or explicit requests from the interface layer and if an implicit request, attempting to convert the implicit request to an explicit request, whereupon the converted or received explicit request is passed on to the abstraction layer; and the abstraction layer receiving the explicit request and communicating the request directly to the IHS.

14. The IHS of claim 13, further comprising:

a peripheral device.

15. The IHS of claim 14, wherein the peripheral device includes a peripheral device light.

16. The IHS of claim 13, wherein the lighting device includes a peripheral device.

\* \* \* \* \*